H. M. HORNE.
SPRING WHEEL.
APPLICATION FILED JAN. 18, 1919. RENEWED JULY 3, 1920.
1,349,339.
Patented Aug. 10, 1920.
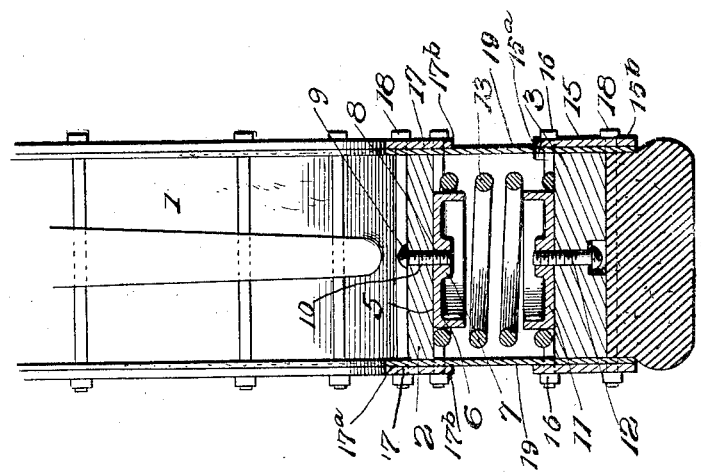
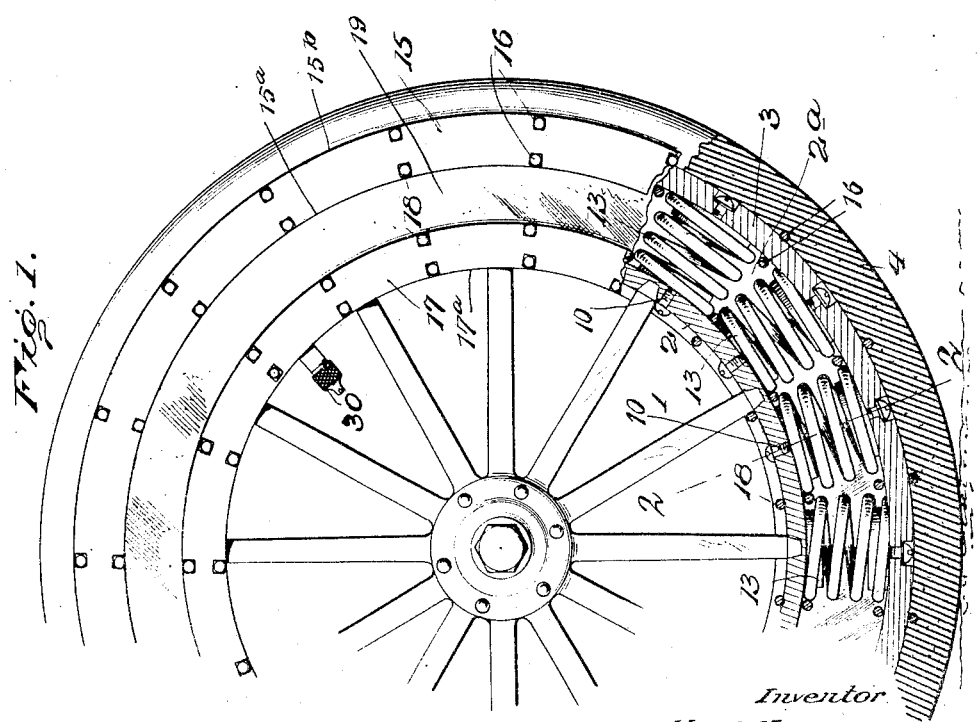
Inventor
H. M. Horne.

UNITED STATES PATENT OFFICE.

HENRY M. HORNE, OF SULPHUR SPRINGS, TEXAS, ASSIGNOR OF ONE-HALF TO W. J. SUDDERTH, OF SULPHUR SPRINGS, TEXAS.

SPRING-WHEEL.

1,349,339. Specification of Letters Patent. Patented Aug. 10, 1920.

Application filed January 18, 1919, Serial No. 271,856. Renewed July 3, 1920. Serial No. 394,013.

*To all whom it may concern:*

Be it known that I, HENRY M. HORNE, a citizen of the United States, residing at Sulphur Springs, in the county of Hopkins and State of Texas, have invented certain new and useful Improvements in Spring-Wheels, of which the following is a specification.

This invention relates to improvements in spring wheels.

The primary object of the invention is to provide a wheel construction embodying all the characteristics of a wheel provided with a pneumatic tire, and one which will not puncture, or become flat.

A further object of the invention is to provide a construction wherein springs are employed between inner and outer rims, means being associated with the springs and the rims to permit of ready and convenient assembling of the parts.

Other objects and advantages will be hereinafter referred to and particularly pointed out in the claims.

In the accompanying drawing:—

Figure 1 is a side elevation of a portion of a wheel equipped with my improved structure, parts being broken away to better illustrate the invention.

Fig. 2 is a detail transverse section on the line 2—2 of Fig. 1.

1 indicates a wheel, and 2 the rim thereof, the latter being hereafter referred to as the inner rim. Spaced as at $2^a$ from the inner rim 2, is an outer rim 3, on which is supported a composition or rubber tire 4. Anchors 5, are secured to the periphery of the inner rim, each anchor comprising a cup shape body 6, curved on its base to snugly engage the rim surface, and provided on its outer surface with a projection 7, formed with a threaded opening 8. Screws 9, passed through from the inner side of the inner rim extend through openings 10 and engage the threaded openings 8, in the projections 7, to retain the anchors in position.

Radially disposed in line with the inner anchors 5, are outer anchors 11, similar in all respects to the anchors 5, and held in fixed position by screws 12, passed through openings formed in the outer rim 3, the screws being inserted from the outer surface of the rim.

13 indicates short stout coil springs, the ends of which engage the surfaces of the inner and outer rims, and snugly fit around the inner and outer anchors, and are thereby retained in position between the rims.

Practically and commercially speaking, it is impossible to insert the springs between the rims when integral flanges on the latter are employed. I have therefore found that this difficulty can be readily overcome by forming the rims flat entirely across their transverse surfaces, and then provide detachable retaining flanges, which in addition serve as means for receiving bolts to prevent circumferential movement of the springs and for holding a closure in position. 15, indicates these annular flanges, same being located on opposite sides of the outer rim 3, the flanges extending beyond the inner and outer surfaces of the rim as indicated at $15^a$ and $15^b$. Projecting through the extended portions $15^a$ and $15^b$ of the flanges 15, and engaging the inner and outer surfaces of the rim, are bolts 16, disposed in radial planes between the springs 13. Similar annular flanges 17, are located on opposite sides of the inner rim 2, and extend beyond the inner and outer surfaces thereof as indicated at $17^a$ and $17^b$, and through the extended portions $17^a$ and $17^b$ project bolts 18, which engage the inner and outer surfaces of the rim. These bolts 18, are disposed in radial planes between the springs.

The flanges 15 and 17, clamp flexible closures 19, to protect the working parts from the elements.

The flanges 15, in addition to securing the flexible closure, also acts as a means for retaining the tire 4 in position on the outer rim, as disclosed in Fig. 2.

When the parts are assembled, the ends of the springs are radially centered around the anchors, and as the latter are rigidly secured to the rims by screws, it follows that the two rims will be held in relation to each other, and circumferential movement of one rim will be imparted to the other.

To prevent possible lateral movement of the rims, displacing the springs from the anchors, the flanges are so disposed as to form with the sides of the anchors pockets for the ends of the springs. Thus, should either rim be laterally shifted the end coils of the springs will be confined, and thereby prevented from becoming displaced.

30 indicates a valve for introducing air in the space between the rims. The purpose of introducing air into the space is to retain the closures in an expanded condition and thereby prevent the ruffling and the consequent result of the moving parts wearing and destroying the flexible material.

What I claim is:—

1. A spring wheel comprising inner and outer spaced rims, the opposing surfaces of which are transversely flat, anchors on the opposing surfaces of the inner and outer rims, each anchor having a central threaded opening, screws inserted from the inside of the inner rim to engage with the threaded openings of the inner anchors, screws inserted from the outer surface of the outer rim to engage the threaded openings in the outer anchors, springs interposed between the inner and outer rims, and fitting over the anchors, and means to prevent undue circumferential movement of the rims displacing the springs from the anchors.

2. A spring wheel comprising inner and outer spaced rims, the opposing surfaces of which are transversely flat, springs interposed between and supported on the flat surfaces, means for anchoring the opposite ends of the springs, flanges on the opposite sides of the inner and outer rims, said flanges extending beyond the edges of the rims, flexible closures interposed between the rims and the flanges, bolts connecting the extended portions of the opposite flanges on the sides of the inner rim and located in radial planes between the springs and engaging the inner and outer surfaces of said rim, bolts connecting the extended portions of the flanges on the sides of the outer rim and located in radial planes between the springs and engaging the inner and outer surfaces of said outer rim, and a resilient tire on the outer periphery of the outer rim, said tire being retained in position by the extended flanges and the bolts connecting same.

HENRY M. HORNE